Patented Oct. 26, 1926.

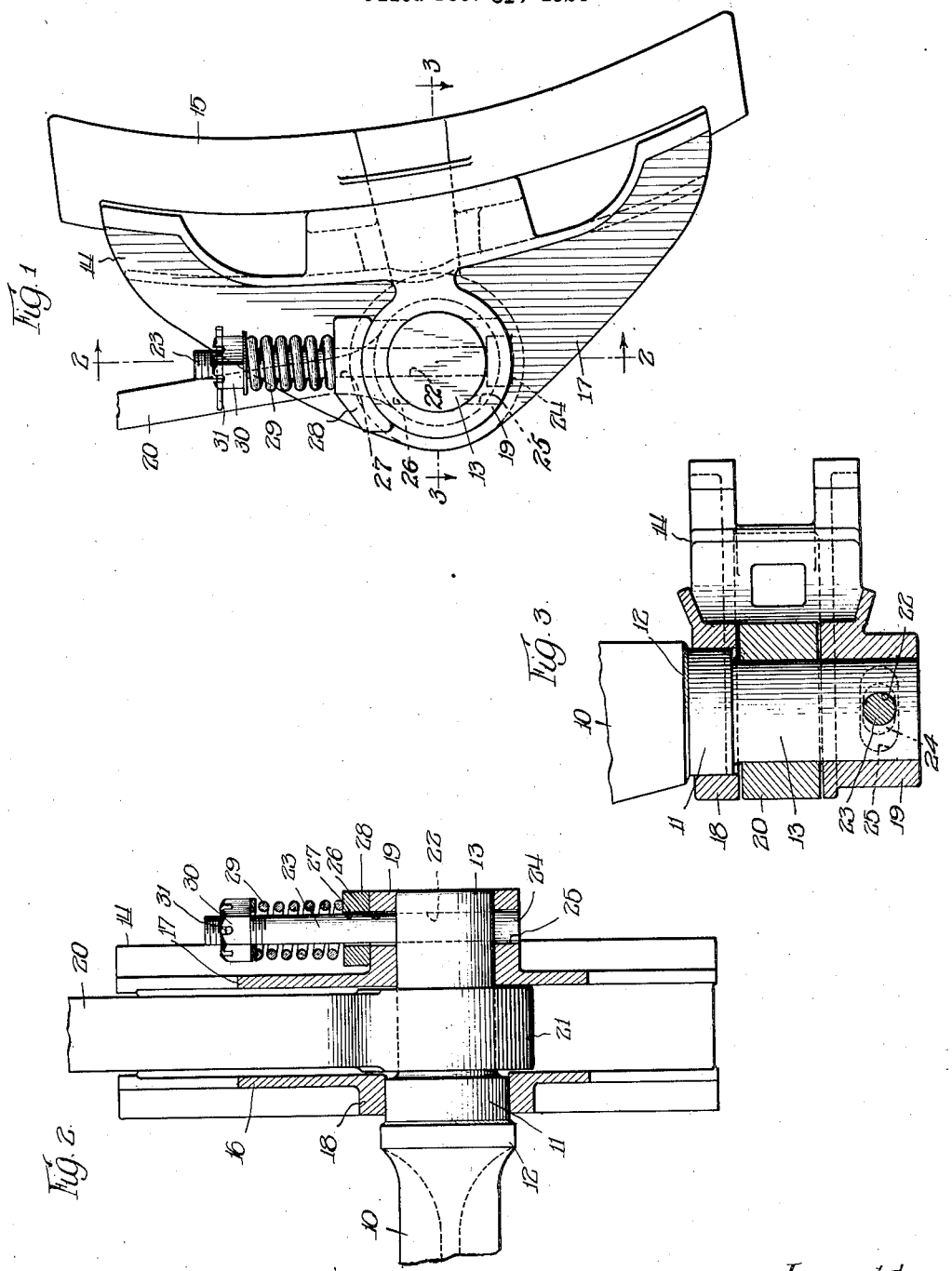

1,604,351

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

Application filed December 31, 1924. Serial No. 758,979.

This invention relates to brake mechanism and more particularly to an adjustable brake head arrangement.

One object of the invention is to provide a brake head which is adjustable on a brake beam trunnion or support within the practical limits to meet varying relations between the brake beam and the wheel and at the same time to maintain the brake head sufficiently fixed on the beam or support to prevent the brake shoe from falling over and dragging against the wheel when the brake is released.

Another object is to provide simple, reliable and efficient means to prevent the brake head from being displaced endwise of the beam or support.

Another object is to provide brake head adjusting and locking means which are readily accessible when the brake beam is mounted upon the car truck.

Another object is to provide a simple combination of brake parts including a brake head, brake beam and hanger where space is inherently limited.

These and other objects are accomplished by means of the arrangement shown on the accompanying sheet of drawings in which,—

Fig. 1 is a side elevation of brake mechanism embodying my invention;

Fig. 2 is a sectional view of the same taken in the plane of line 2—2 of Fig. 1, and Fig. 3 is a sectional view taken in the plane of line 3—3 of Fig. 1.

The various novel features of the invention will be apparent from the following description and drawings and will be particularly pointed out in the appended claims.

Referring to the figures of the drawings, it will be noted that I have illustrated my invention in connection with brake mechanism including a brake beam 10 having a stepped trunnion, the larger trunnion portion 11 being adjacent to a shoulder 12 on the brake beam and the smaller trunnion portion 13 being located outwardly therefrom. Mounted upon the stepped trunnion is a brake head 14 carrying a brake shoe 15 and having two spaced flanges 16 and 17. The flange 16 has a hub 18 mounted on the relatively large trunnion portion 11. The flange 17 has a relatively longer hub 19 mounted upon the smaller trunnion portion 13. Accordingly, the bores of the hubs 18 and 19 are of different diameters. The flanges 16 and 17 are spaced for the reception of a brake hanger 20, the lower eye portion 21 of which embraces the smaller trunnion portion 13. It will be understood that the hanger 20 will be connected to any suitable member for supporting the brake beam 10 and associated parts.

The smaller trunnion portion 13 near its outer end has a diametrically arranged opening 22 for the reception of the shank of a bolt 23. The head 24 of the bolt is mounted in one of two oppositely arranged elongated slots 25 and 26 formed in the relatively long hub 19. Not only does the bolt 23 extend through the slots 25 and 26 and opening 22, but also through an opening 27 in a block 28 which frictionally engages the outer cylindrical surface of the hub 19. Coiled around the bolt 23 is a spring 29 which is confined between the friction block 28 and an adjustable nut 30, engaging the threaded end of the bolt for varying the tension of the spring and accordingly the pressure with which the block 28 is pressed into engagement with the hub 19, and also the pressure with which the hub 19 and the trunnion engage each other. A suitable key 31 cooperating with the bolt 23 and nut 30 may be used for holding the nut in adjusted position.

By means of this arrangement the brake head is yieldably and adjustably mounted upon the brake beam trunnion and locked thereon against lateral displacement. The slots 25 and 26 are sufficiently long to permit the required movement of the brake head with respect to the brake beam and in accordance with the wear of the shoe 15. The brake head automatically adjusts itself on the brake beam trunnion in accordance with shoe wear and is yieldingly held in adjusted position. By having the bolt 23, friction block 28, spring 29 and nut 30 located laterally outwardly with respect to both of the flanges 16 and 17 of the brake head, adjustments may be easily and quickly made. Also by means of this arrangement the parts in question can be mounted and adjusted in a relatively limited space.

I claim:

1. In brake mechanism, the combination of a brake beam having a trunnion, a brake head having flanges with outwardly extending hubs mounted on said trunnion, and means angularly arranged with respect to and cooperating with said trunnion and one of said outwardly extending hubs for yieldably and adjustably holding said brake head on said trunnion.

2. In brake mechanism, the combination of a brake beam having a stepped trunnion, a brake head having flanges with outwardly extending hubs with bores of different diameter and mounted on said stepped trunnion, and means cooperating with one trunnion portion and one of said hubs and extending radially with respect thereto for yieldably and adjustably holding said brake head on said trunnion.

3. In brake mechanism, the combination of a brake beam having a trunnion with an opening therein, a brake head having flanges with outwardly extending hubs mounted on said trunnion, one of said hubs having oppositely arranged elongated slots, an apertured block frictionally engaging said last mentioned hub, a bolt the head of which occupies one of said elongated slots and the shank of which extends through said trunnion opening and friction block, and a confined spring pressing against said block for yieldably and adjustably holding said brake head on said trunnion.

4. In brake mechanism, the combination of a brake head having a flange with an outwardly extending hub, a part on which said head and hub are mounted, and means cooperating with said part and said outwardly extending hub for yieldably and adjustably holding said brake head on said part.

5. In brake mechanism, the combination of a brake head having spaced flanges, one of which has an outwardly extending hub, a part on which said head and hub are mounted, and radially extending means located laterally exteriorly with respect to said flanges and cooperating with said part and said hub for yieldably and adjustably holding said brake head on said part.

6. In brake mechanism, the combination of a brake head having spaced flanges one of which has a hub with oppositely arranged elongated slots therein, a part on which said head and hub are mounted and having an opening, a bolt the head of which is located in one of said elongated slots and the shank of which passes through said opening, a friction block mounted on said bolt and engaging said hub, and a confined spring pressing against said block for yieldably and adjustably holding said brake head on said part.

7. In brake mechanism, the combination of a brake beam having a trunnion, a brake head having spaced flanges, a brake hanger mounted on said trunnion between said flanges, and means mounted laterally exteriorly with respect to one of said flanges for yieldably and adjustably holding said brake head on said trunnion.

8. In brake mechanism, the combination of a brake head having a flange with an outwardly extending hub, a part on which said head and hub are mounted, and radially extending means cooperating with said part and said outwardly extending hub for yieldably and adjustably holding said brake head on said part.

Signed at Chicago, Illinois, this 27th day of December, 1924.

WILLIAM C. HEDGCOCK.